United States Patent
Rudelic

(10) Patent No.: US 7,093,071 B2
(45) Date of Patent: Aug. 15, 2006

(54) QUEUED COPY COMMAND

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 10/268,618

(22) Filed: Oct. 9, 2002

(65) Prior Publication Data

US 2004/0073748 A1    Apr. 15, 2004

(51) Int. Cl.
 *G06F 12/00* (2006.01)

(52) U.S. Cl. .................. 711/118; 711/103; 711/129; 711/161; 711/162

(58) Field of Classification Search ............... 711/103, 711/118, 129, 161, 162; 365/185.29, 185.3, 365/185.31, 185.32, 185.33
See application file for complete search history.

(56) References Cited

U.S. PATENT DOCUMENTS

| | | | | |
|---|---|---|---|---|
| 5,630,093 A | * | 5/1997 | Holzhammer et al. | 711/115 |
| 6,014,755 A | * | 1/2000 | Wells et al. | 714/8 |
| 6,301,639 B1 | * | 10/2001 | Cleavinger et al. | 711/112 |
| 6,704,835 B1 | * | 3/2004 | Garner | 711/103 |

OTHER PUBLICATIONS

Intel, Virtual Small Block File Manager User's Guide; Nov. 2000.*

* cited by examiner

*Primary Examiner*—Reginald G. Bragdon
*Assistant Examiner*—Mehdi Namazi
(74) *Attorney, Agent, or Firm*—Fish & Richardson P.C.

(57) ABSTRACT

A memory system including a programmable memory, such as a flash memory, may include a write buffer. A processor may generate and store a queue of commands to write a sequence of valid bytes in a reclaim operation. A controller in the memory system may perform the write commands in the write buffer without intervention by the processor.

25 Claims, 5 Drawing Sheets

QUEUED COPY COMMAND

BACKGROUND

Flash memory (sometimes called "flash ROM") may be erased and reprogrammed in blocks instead of one byte at a time. Flash memory may be used to hold control code, e.g., the basic input/output system (BIOS) in a personal computer. When BIOS needs to be changed (rewritten), the flash memory may be written to in byte sizes, making flash memory relatively easy to update. Flash memory may also be used in modems and enable the modem manufacturer to support new protocols as they become standardized.

DETAILED DESCRIPTION

Figure 1:
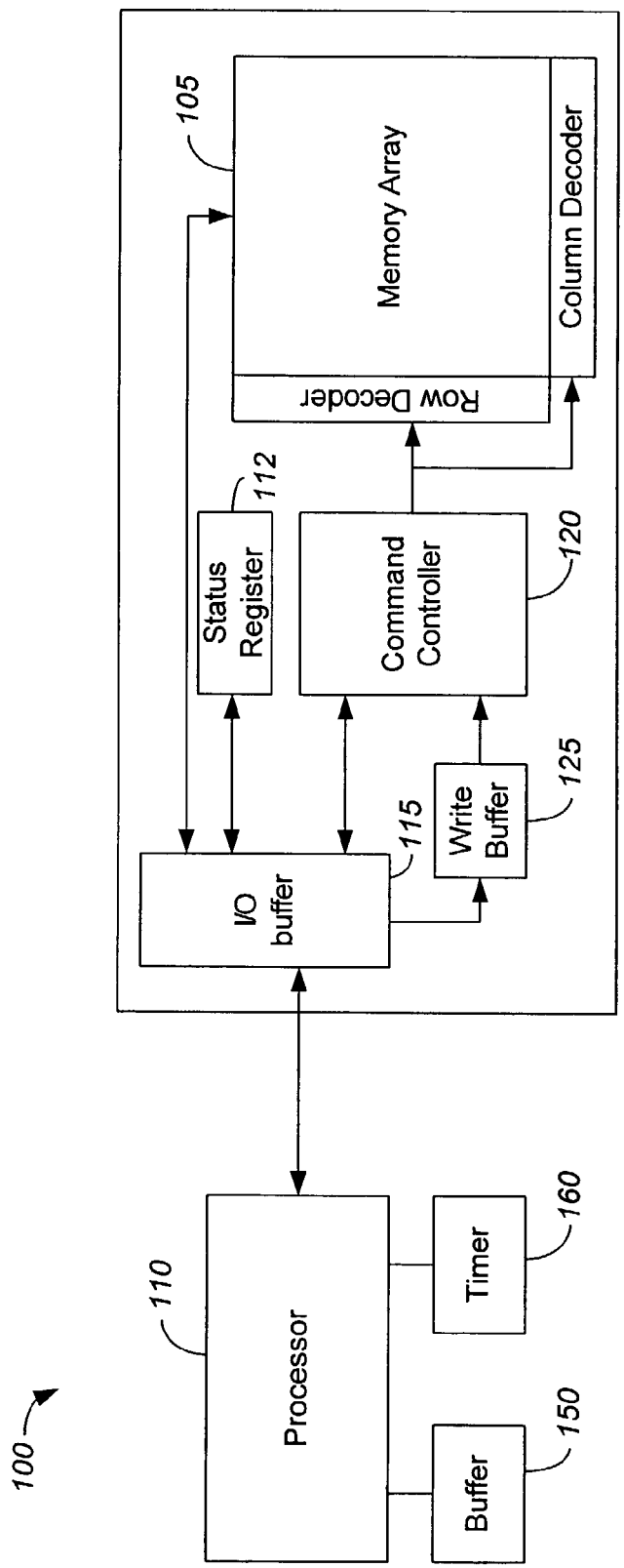
FIG. 1 is a block diagram of a memory system including a write buffer.

FIG. 1 illustrates a memory system 100 which may include a programmable memory, such as a flash memory. Flash memory (or "flash ROM") may include a type of nonvolatile memory which may be erased and reprogrammed in units of memory called blocks. The memory system 100 may include an array 105 of flash memory cells arranged in rows and columns, although the scope of the present invention is not limited in this respect. A processor 110 may issue commands and exchange data with the memory system 100 through a bus interface, which may include an Input/Output (I/O) buffer 115.

The processor 110 may also communicate with a memory device, such as a static random access memory (SRAM) 102. The processor 110 may exchange and/or compare data between the memory system 100 and the SRAM 102.

A command controller 120 may receive and interpret commands which instruct the memory system 100 to perform programming, reading, and erasing operations on the memory cells of the array 105. The processor 110 may periodically monitor the memory system, e.g., by reading the contents of a status register 112, in order to determine whether an operation has been completed and whether the operation was successful, although the scope of the present invention is not limited in this respect.

The memory system 100 may include a write buffer 125. The write buffer 125 may include a set of registers used to hold several words to be programmed as a group. The write buffer 125 may be filled with words to be programmed before issuing a write buffer programming command. The time to program a word may be reduced by performing programming overhead operations once for the entire group of words.

The write buffer 125 may also be used to store a sequence of commands. These commands may be used by the command controller 120 to perform a reclaim operation independently, freeing the processor 110 to perform other work.

The command controller 120 may perform a reclaim operation when a specified percentage of memory blocks in the flash memory are filled by either valid data or "dirty" areas. The reclaim operation may reclaim the dirty space so that it can continue writing or updating new data.

Figure 2:
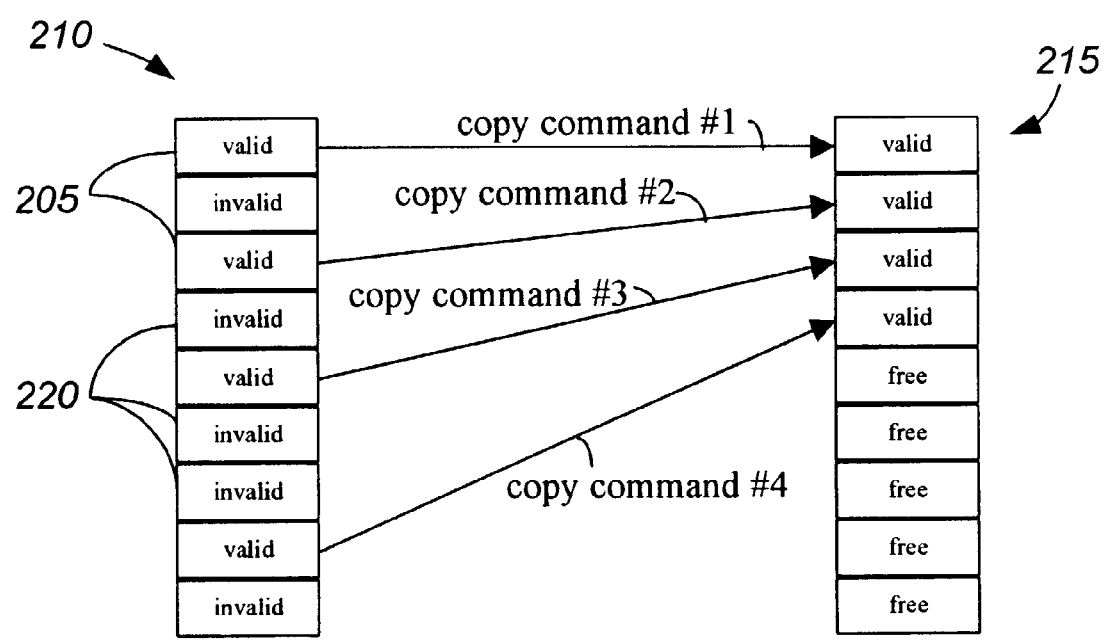
FIG. 2 is a block diagram illustrating a reclaim operation.

The command controller 120 may set aside an entire memory block for reclaim purposes, although the scope of the present invention is not limited in this respect. This block may be referred to as an "erase" or "spare" block. To reclaim dirty space, the command controller 120 may select a memory block 210 with a large amount of dirty space. The command controller 120 may copy valid information 205 from the selected block 210 over to a spare block 215, leaving the dirty areas 220 behind, as shown in FIG. 2. The dirty block 210 may then be erased. The newly erased block may be marked as the spare block and used for the next reclaim process, although the scope of the present invention is not limited in this respect.

Figure 3:
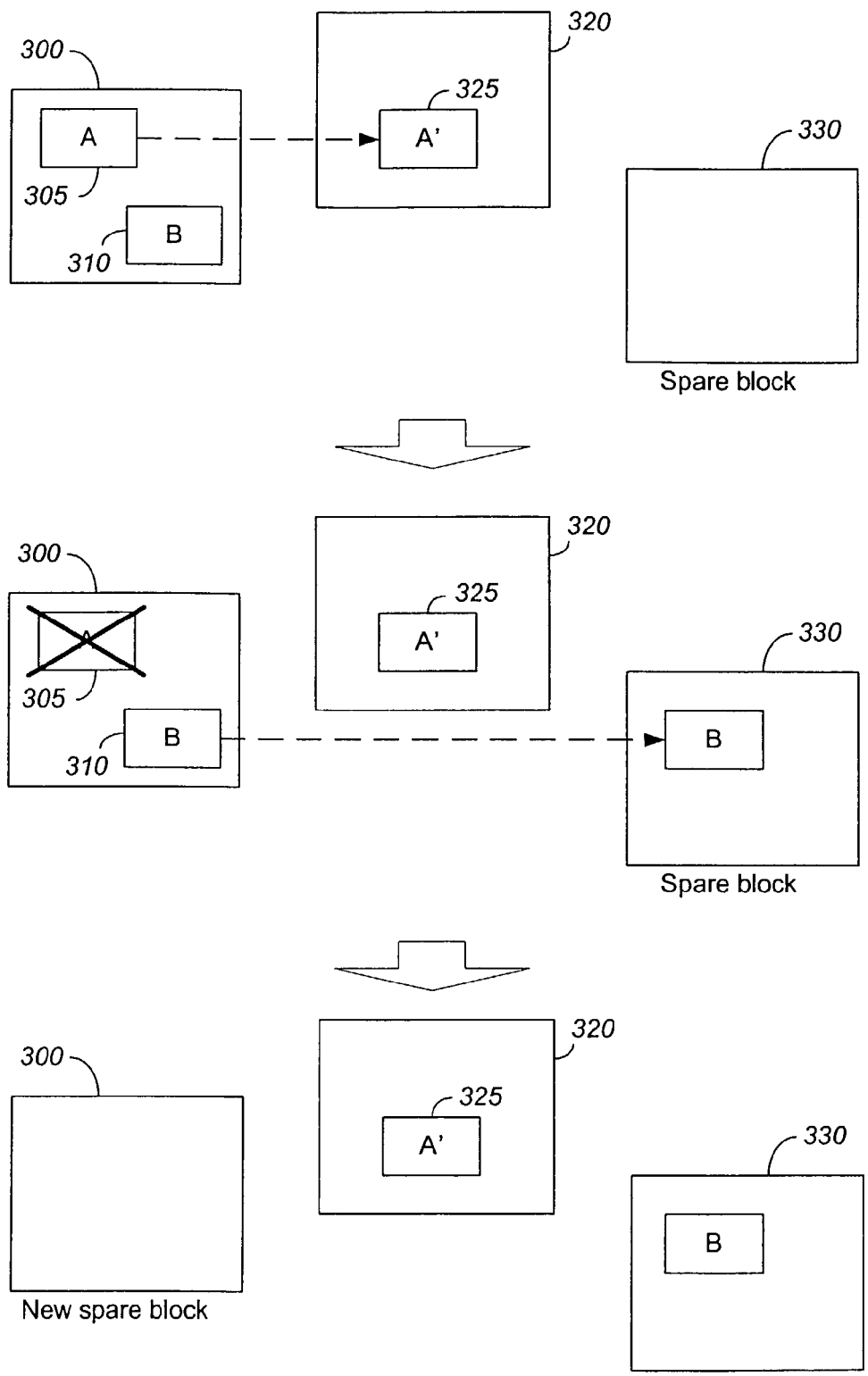
FIG. 3 is a block diagram illustrating another reclaim operation.

FIG. 3 illustrates an exemplary reclaim operation. A File A 305 and a File B 310 may be written to a block 300. If File A is modified, the modified copy, File A' 325, may be stored in another block 320, and the original copy of File A may be invalidated. If the decision is made to reclaim the block 300 containing File A and File B, File B and any other valid data may be copied to a spare block 330, and File A erased with the rest of the dirty block 300. The newly erased block 300 may then be designated as the spare block for the next reclaim operation.

In a reclaim operation, the processor 110 may poll the command controller 120 after issuing a write command to determine if a valid byte (or word) was successfully copied. The processor 110 may issue a write command to copy the next valid byte to the spare block. Thus, the processor 110 may continually monitor the memory system 100 and issue commands after a valid byte is copied during the reclaim operation. This continual monitoring may make the processor 110 generally unavailable for other tasks.

Figure 4:
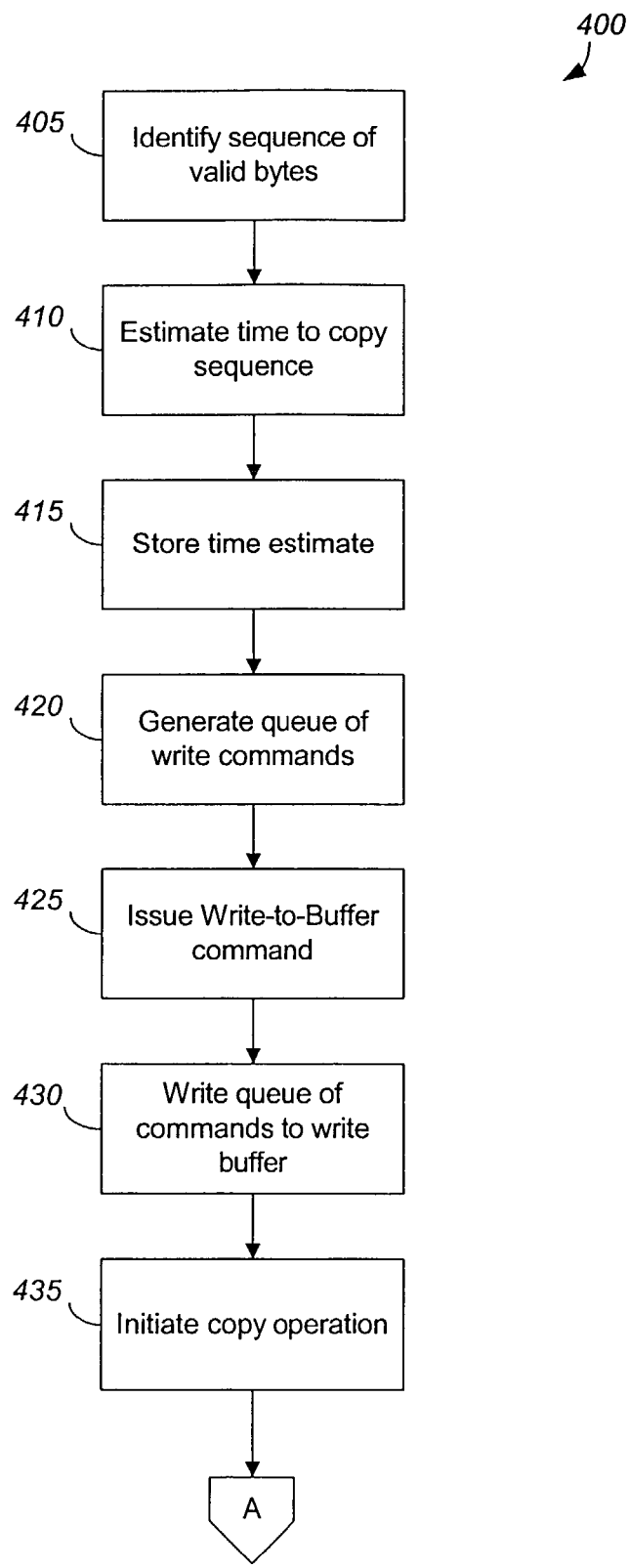
FIGS. 4 and 5 are flowcharts describing a reclaim operation utilizing queued copy commands.

FIG. 4 is a flowchart describing a reclaim operation 400 utilizing the write buffer 125. In many instances, the valid blocks copied to the spare block during a reclaim operation are in relatively large groups, e.g., runs of 128 or 256 bytes. Rather than issuing separate write commands and then polling for a copy operation, the processor 110 may write a series of write commands to the write buffer 125 for the command processor 110 to perform sequentially without monitoring by the processor 110. This may free processor resources.

The processor 110 may identify a sequence of valid bytes to be copied from the block being reclaimed (block 405). The processor 110 may estimate the time period for the command processor 110 to copy the sequence of valid bytes to the spare block (block 410). The processor 110 may store the estimate in a buffer 150 (block 415), although the scope of the present invention is not limited in this respect. The processor 110 may then generate a queue of write commands which instruct the command controller 120 to copy the identified sequence of valid bytes from the dirty block to the spare block (block 420).

The processor 110 may issue a "write to buffer" command (block 425) and perform checks to determine if the write buffer 125 is available, although the scope of the present invention is not limited in this respect. The processor 110 may write the queue of write commands to the write buffer 125 (block 430). The processor 110 may then issue a confirmation command to initiate the copy operation (block 435).

Figure 5:
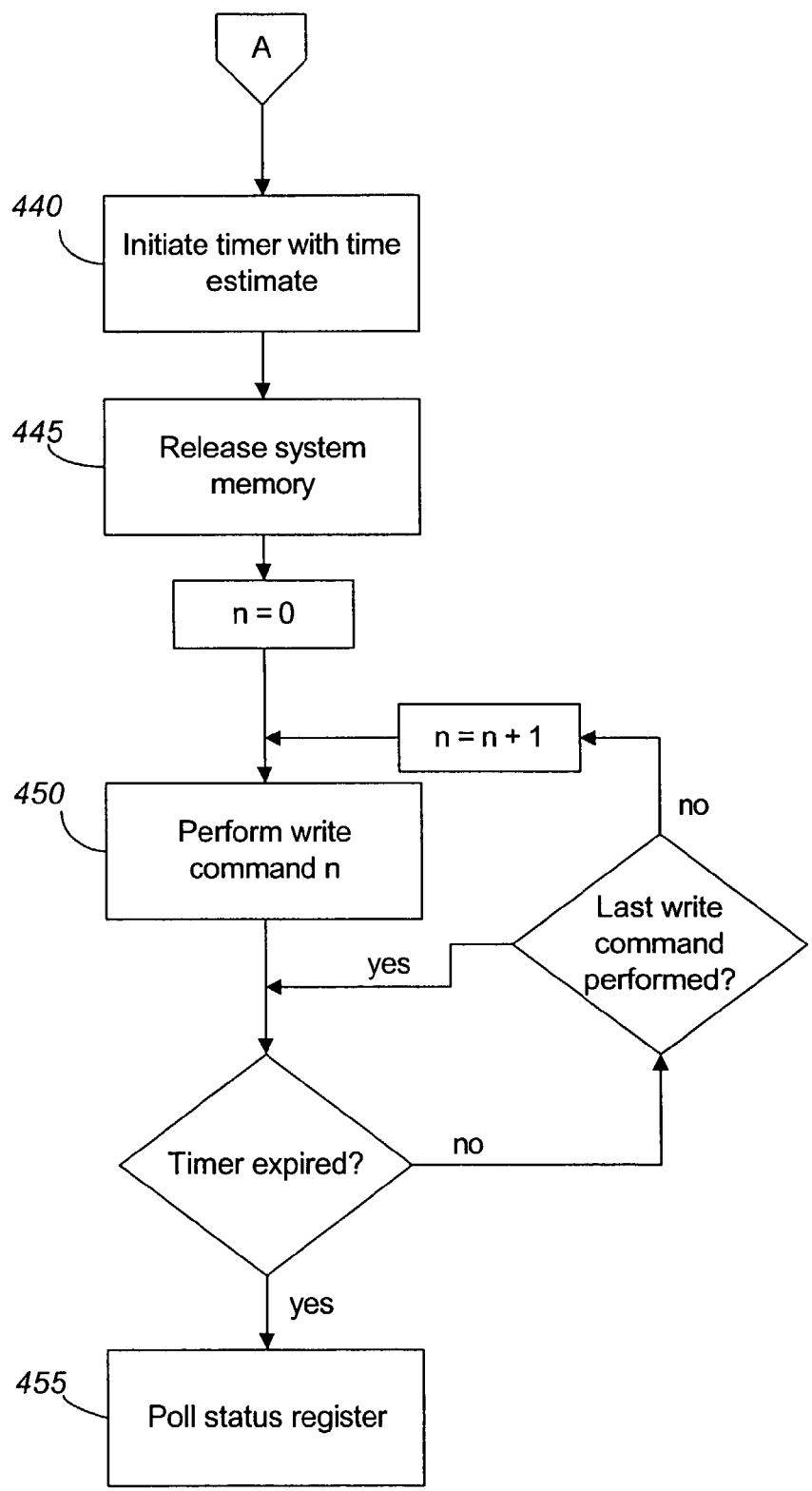

The processor 110 may initiate a timer 160 with the estimated time stored in the buffer 150 (block 440) (FIG. 5) and then release the memory system 100 (block 445), freeing the processor 110 to perform other tasks. The command controller 120 may operate on the queued commands sequentially until all write operations have been performed (block 450). When the timer expires, the processor 110 may poll the status register to determine if the queued copy command operation as been successfully completed (block 455), although the scope of the present invention is not limited in this respect.

A number of embodiments have been described. Nevertheless, it will be understood that various modifications may be made without departing from the spirit and scope of the invention. For example, the blocks in the flowcharts may be skipped or performed out of order and still produce desirable results. Accordingly, other embodiments are within the scope of the following claims.

The invention claimed is:

1. A system comprising:
   a first memory block storing a plurality of sequential valid data blocks which are associated with a valid information designation;
   a second memory block which is capable of storing information, and is associated with a designation associated with spare space;
   a write buffer;
   an I/O part, receiving a plurality of commands to write the plurality of sequential valid data blocks from the first memory block to the second memory block and change said designation associated with said second memory block and to store said plurality of commands in the write butter; and
   a controller to perform the plurality of commands in the write buffer without further commands over the I/O port.

2. The apparatus of claim 1, further comprising:
   a memory array including the first memory block and the second memory block, wherein the memory array comprises a plurality of flash memory elements.

3. A system as in claim 1, further comprising a processor, coupled to said I/O part, and sending commands to said I/O part, said processor carrying out another operation unrelated to said commands to write, while said commands in the write buffer are being executed by said controller.

4. The apparatus of claim 3, wherein the controller is further operative to perform the plurality of commands in the write buffer without intervention by the processor.

5. The apparatus of claim 3, wherein the processor is further operative to estimate a time to perform the plurality of commands and carries out said another operation for said time.

6. The apparatus of claim 5, further comprising:
   a timer to store said estimated time.

7. The apparatus of claim 6, further comprising:
   a status register to store a status of a write operation to the second memory block.

8. The apparatus of claim 7, wherein the processor is further operative to initiate the timer prior to the controller performing the plurality of commands.

9. Apparatus comprising:
   a first memory block to store a plurality of sequential valid data blocks;
   a second memory block;
   a write buffer;
   a processor operative to generate a plurality of commands to write the plurality of sequential valid data blocks to the second memory block and to store said plurality of commands in the write buffer;
   a timer to store an estimated time to perform the plurality of commands;
   a controller to perform the plurality of commands in the write buffer; and
   a status register to store a status of a write operation to the second memory block,
   wherein the processor is further operative to:
   estimate said estimated time,
   initiate the timer prior to the controller performing the plurality of commands, and
   poll the status register in response to the timer expiring.

10. A method comprising:
    receiving from a processor a plurality of commands to write a plurality of sequential valid data blocks from a first dirty memory block to a second spare memory block in a memory system;
    storing the plurality of commands in a write buffer in the memory system; and
    performing a plurality of write operations which write said sequential valid data blocks from said dirty memory block to said spare memory block in response to said plurality of commands without receiving any further commands from said processor.

11. The method of claim 10, further comprising:
    performing a reclaim operation in a flash memory system.

12. The method of claim 11, wherein said performing the plurality of write operations comprises writing the plurality of sequential data blocks to a spare block.

13. The method of claim 10, further comprising:
    estimating a time to perform the plurality of write operations.

14. The method of claim 13, further comprising:
    setting a timer with said estimated time.

15. The method of claim 14, further comprising:
    initiating the timer; and
    performing a first write operation in the plurality of write operations.

16. The method of claim 13, further comprising:
    monitoring the memory system with a processor; and
    discontinuing said monitoring for said estimated time.

17. The method of claim 10, wherein said generating the plurality of commands is performed by a processor.

18. The method of claim 17, wherein said performing the plurality of write operations as performed with a controller in the memory system without intervention by the processor.

19. An article including a machine-readable medium including machine-executable instructions, the instructions operative to cause a machine to:
    generate a plurality of commands to write a plurality of sequential valid data blocks from a dirty memory block to a spare memory block in a memory system which plurality of commands are intended to be stored in a write buffer in the memory system, and used to perform a plurality of write operations which write said sequential valid data blocks from said dirty memory block to said spare memory block in response to said plurality of commands,
wherein the instructions for performing the plurality of write operations comprises instructions to cause the machine to write the plurality of sequential valid data blocks from the first memory block into the second memory block; and
carrying out another function while said valid data blocks are being written.

20. The article of claim 19, wherein said generate includes instructions operative to cause the machine to:
perform a reclaim operation in a flash memory system.

21. The article of claim 20, wherein the instructions operative to cause the machine to perform the plurality of write operations comprise instructions operative to cause the machine to write the plurality of sequential valid data blocks to a spare block.

22. The article of claim 19, further comprising instructions operative to cause the machine to:
estimate a time to perform the plurality of write operations.

23. The article of claim 22, further comprising instructions operative to cause the machine to:
set a timer with said estimated time.

24. The article of claim 23, further comprising instructions operative to cause the machine to:
initiate the timer; and
perform a first write operation in the plurality of write operations.

25. The article of claim 22, further comprising instructions operative to cause the machine to:
monitor the memory system with a processor; and
discontinue said monitoring for said estimated time.

* * * * *